(12) United States Patent
Louboutin

(10) Patent No.: US 8,868,254 B2
(45) Date of Patent: Oct. 21, 2014

(54) ACCESSORY CONTROL WITH GEO-FENCING

(75) Inventor: Sylvain Louboutin, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 203 days.

(21) Appl. No.: 13/492,713

(22) Filed: Jun. 8, 2012

(65) Prior Publication Data
US 2013/0332007 A1 Dec. 12, 2013

(51) Int. Cl.
*H04W 4/02* (2009.01)
*H04W 4/04* (2009.01)
*G06F 17/00* (2006.01)

(52) U.S. Cl.
CPC .............. *G06F 17/00* (2013.01); *H04W 4/021* (2013.01); *H04W 4/046* (2013.01)
USPC ......... 701/2; 701/1; 340/426.19; 340/539.13; 455/456.2; 455/456.6

(58) Field of Classification Search
CPC ..... H04W 4/021; H04W 4/046; H04W 4/022; H04W 4/02; H04W 64/003; H04W 4/04; G06F 17/00; G07C 9/00309; G07C 2009/00793
USPC .................. 701/1, 2, 36; 340/539.13, 426.19; 455/456.2, 456.6
See application file for complete search history.

(56) References Cited

U.S. PATENT DOCUMENTS

| | | | |
|---|---|---|---|
| 6,977,630 B1 * | 12/2005 | Donath et al. ................... 345/7 |
| 7,805,148 B2 | 9/2010 | Lovell, Jr. | |
| 7,817,033 B2 | 10/2010 | Motoyama | |
| 7,912,630 B2 * | 3/2011 | Alewine et al. ............. 701/34.4 |
| 7,941,130 B2 | 5/2011 | Moton, Jr. et al. | |
| 8,035,503 B2 | 10/2011 | Partin et al. | |
| 8,180,379 B2 | 5/2012 | Forstall et al. | |
| 8,320,931 B2 * | 11/2012 | Ward et al. ................. 455/456.1 |

(Continued)

FOREIGN PATENT DOCUMENTS

| | | |
|---|---|---|
| CN | 2645367 Y | 9/2004 |
| JP | 2002359593 A | 12/2002 |
| KR | 20060108997 A | 10/2006 |
| KR | 20090089501 A | 8/2009 |

OTHER PUBLICATIONS

European Search Report mailed Oct. 10, 2013 in EP Application No. 13170580, 6 pages.

(Continued)

*Primary Examiner* — Russell Frejd
(74) *Attorney, Agent, or Firm* — Kilpatrick Townsend & Stockton LLP

(57) ABSTRACT

A vehicle accessory can transmit a first signal to a mobile device, the first signal including a location of a vehicle. The mobile device can monitor its own location. The mobile device can assess whether one or more location-based criteria have been satisfied based on the location of the mobile device and the location of the vehicle. Upon determining that a location-based criterion has been satisfied, the mobile device can transmit a second signal to the vehicle accessory indicating that a function of the vehicle is to be controlled. Thus, for example, the mobile device can activate or de-activate vehicle features (e.g., door locking, vehicle defrosting, etc.) in a manner that capitalizes on efficient signal transmission.

24 Claims, 11 Drawing Sheets

(56) References Cited

U.S. PATENT DOCUMENTS

| | | |
|---|---|---|
| 8,498,805 B2 * | 7/2013 | Joong et al. .................. 701/408 |
| 2006/0099971 A1 | 5/2006 | Staton et al. |
| 2007/0185728 A1 * | 8/2007 | Schwarz et al. ................. 705/1 |
| 2008/0184751 A1 | 8/2008 | Olsen et al. |
| 2009/0140886 A1 | 6/2009 | Bender |
| 2010/0148947 A1 | 6/2010 | Morgan et al. |
| 2010/0227628 A1 * | 9/2010 | Anderson et al. ......... 455/456.3 |
| 2010/0284290 A1 * | 11/2010 | Williams ..................... 370/252 |
| 2011/0001638 A1 * | 1/2011 | Pudar .......................... 340/988 |
| 2011/0086668 A1 | 4/2011 | Patel |
| 2011/0263240 A1 * | 10/2011 | Featherstone et al. ........ 455/418 |
| 2012/0058826 A1 * | 3/2012 | Amaitis et al. ................. 463/42 |

OTHER PUBLICATIONS

International Search Report and Written Opinion mailed Jul. 11, 2013, PCT Application No. PCT/US13/41210, 9 pages.

* cited by examiner

ACCESSORY CONTROL WITH GEO-FENCING

BACKGROUND

The present disclosure relates generally to conditionally transmitting signals (e.g., that control a vehicle function) to a vehicle accessory based on proximity to the vehicle accessory.

Vehicles can perform a large variety of functions. The functions can relate to, e.g., vehicle climate control, navigation instructions, security features, or music selection and output. While each function can be designed to provide a positive result (e.g., locked doors providing vehicle security or a global-navigation-system providing travel routes), various circumstances can reduce a net benefit of the functions enjoyed by a vehicle operator.

For example, an operator can lock doors on the vehicle subsequent to parking the vehicle. The locked state can prevent or deter theft of the vehicle, but it can also subsequently frustrate the operator when he returns to the vehicle. Unlocking a door can require additional time that it lengthens a total commute duration, or unlocking a door can be difficult if his hands are full of other objects (e.g., groceries).

Functions associated with a reduced net benefit can negatively affect a driver's mood and can decrease the probability that the operator will utilize the function. Thus, technology associated with the vehicle functions is not utilized to achieve its maximum benefit.

SUMMARY

According to various embodiments of the present invention, a vehicle accessory can transmit a first signal (e.g., a signal comprising vCard data) to a mobile device (e.g., a phone). The first signal can identify a current or future location of the vehicle. The mobile phone can generate one or more virtual geofences based at least in part on the location of the vehicle. For example, a geofence can be defined as a circular boundary centered on the vehicle's location, the radius being equal to a pre-defined distance. The mobile phone can repeatedly estimate its own location. The mobile phone can then determine whether it has crossed a geofence by, e.g., analyzing its own location in view of a boundary of a geofence or based on a distance between the vehicle and the mobile phone. In some instances, the mobile phone can further estimate its motion, such that it can determine a direction in which it is crossing a geofence. Upon detecting that the mobile phone has crossed a geofence (e.g., generally or in a particular direction), the mobile phone can generate and transmit a second signal to the vehicle. The accessory can control or coordinate control of one or more vehicle functions in response to receipt of the second signal.

For example, a vehicle accessory can detect that a vehicle has parked and further detect geographic coordinates (and, in some instances, an altitude) of the vehicle. The vehicle accessory can then generate and transmit a signal including a vCard to a mobile phone, the vCard including the geographic coordinates (e.g., and altitude). The mobile phone can receive the signal and access a set of location-based function control rules. Rules can identify geofence spatial parameters relative to vehicle-location characteristics. For example, geofences can include circular geofences with vehicle-related origins, geofences with shapes paralleling vehicle components (e.g., tied to a door, a trunk or a hood), etc. The mobile phone can then identify absolute-location boundaries of the geofences in the rules. The mobile phone can repeatedly monitor its location relative to the geofence boundaries and detect when a boundary has been crossed, a direction in which the boundary is being crossed, a point of the boundary being crossed, and/or a speed at which the mobile phone is moving when the boundary is crossed. Function control rules can include specific control commands that are to be transmitted to the vehicle upon crossing specific relative boundaries. For example, function control rules can identify parameters related to door locking, trunk opening, vehicle running, heater or cooling operation, defroster operation, music selection or status, accessory power states, seat warmers, navigation operations, etc. Upon detecting a particular geofence crossing (e.g., and a direction in which an ingress or egress of the geofence is made), the mobile phone can generate and transmit a second signal to the vehicle accessory identifying the function control to be implemented.

By erecting virtual geofences, a mobile device's signal transmission can be intelligently controlled. Thus, the mobile device need not attempt to communicate with the vehicle accessory when the communication is not possible given available technology (e.g., the mobile device is out of range for direct wireless communication) or is technologically expensive (e.g., draining batteries, requiring additional network capabilities, etc.).

Transmitting function controls in a manner depending on, e.g., a mobile device's location, direction of movement, and/or speed can further allow for efficient control of vehicle functions. For example, one signal can indicate that the vehicle is to start if the mobile phone is in the driver's seat. If the mobile device instead transmitted function-control signals in a location-independent manner, the vehicle can be started minutes prior to use, which could result in dangerous consequences and waste energy resources.

Further, the initial identification of geofence boundaries can reduce the processing that a mobile device needs to later compute. For example, after locations of geofence boundaries are determined, a mobile device can be able to determine whether the geofence boundary is crossed by simply repeatedly detecting its location and comparing a small number of the detected locations to the geofence boundaries. In some embodiments, the mobile device need not repeatedly attempt to estimate the vehicle's location, repeatedly determine its location relative to the vehicle's location, and/or repeatedly apply complex location-based rules.

DETAILED DESCRIPTION

Figure 1A:
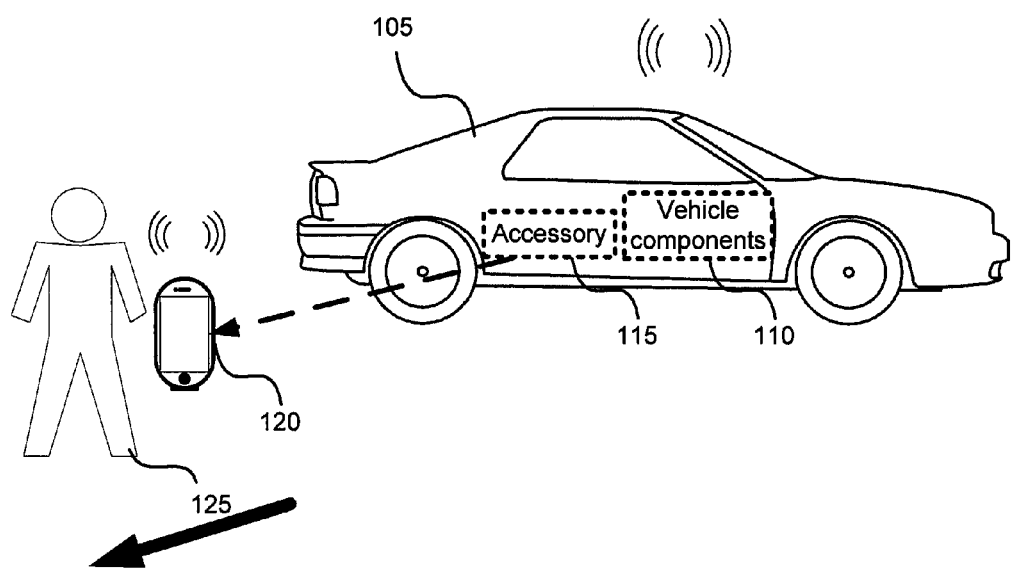
FIG. 1 illustrates an example of geofence operations according to an embodiment of the present invention.

According to various embodiments of the present invention, a vehicle accessory can transmit a first signal (e.g., a signal comprising vCard data) to a mobile device (e.g., a phone). The first signal can identify a current or future location of the vehicle. The mobile phone can generate one or more virtual geofences based at least in part on the location of the vehicle as determined from the first signal. For example, a geofence can be defined as a circular boundary centered on the vehicle's location, the radius being equal to a pre-defined distance. The mobile phone can repeatedly estimate its own location. The mobile phone can then determine whether it has crossed a geofence by, e.g., analyzing its own location in view of a boundary of a geofence or based on a distance between the vehicle and the mobile phone. In some instances, the mobile phone can further estimate its motion, such that it can determine a direction in which it is crossing a geofence. Upon detecting that the mobile phone has crossed a geofence (e.g., generally or in a particular direction), the mobile phone can generate and transmit a second signal to the vehicle. The accessory can control or coordinate control of one or more vehicle functions in response to receipt of the second signal.

For example, a vehicle accessory can detect that a vehicle has parked and further detect geographic coordinates of the vehicle (and, in some instances, an altitude). The vehicle accessory can then generate and transmit a signal including a vCard to a mobile phone, the vCard including the geographic coordinates (e.g., and altitude). The mobile phone can receive the signal and access a set of location-based function control rules. Rules can identify geofence spatial parameters relative to vehicle-location characteristics. For example, geofences can include circular geofences with vehicle-related origins, geofences with shapes paralleling vehicle components (e.g., tied to a door, a trunk or a hood), etc. The mobile phone can then identify absolute-location boundaries of the geofences in the rules. The mobile phone can repeatedly monitor its location relative to the geofence boundaries and detect when a boundary has been crossed, a direction in which the boundary is being crossed, a point of the boundary being crossed, and/or a speed at which the mobile phone is moving when the boundary is crossed. Function control rules can include specific control commands that are to be transmitted to the vehicle upon crossing specific relative boundaries. For example, function control rules can identify parameters related to door locking, trunk opening, vehicle running, heater or cooling operation, defroster operation, music selection or status, accessory power states, seat warmers, navigation operations, etc. Upon detecting a particular geofence crossing (e.g., and a direction in which an ingress or egress of the geofence is made), the mobile phone can generate and transmit a second signal to the vehicle accessory identifying the function control to be implemented.

By erecting virtual geofences, a mobile device's signal transmission can be intelligently controlled. Thus, the mobile device need not attempt to communicate with the vehicle accessory when the communication is not possible given available technology (e.g., the mobile device is out of range for direct wireless communication) or is technologically expensive (e.g., draining batteries, requiring additional network capabilities, etc.).

Transmitting function controls in a manner depending on, e.g., a mobile device's location, direction of movement, and/or speed can further allow for efficient control of vehicle functions. For example, one signal can indicate that the vehicle is to start if the mobile phone is in the driver's seat. If the mobile device instead transmitted function-control signals in a location-independent manner, the vehicle can be started minutes prior to use, which could result in dangerous consequences and waste energy resources.

Further, the initial identification of geofence boundaries can reduce the processing that a mobile device needs to later compute. For example, after locations of geofence boundaries are determined, a mobile device can be able to determine whether the geofence boundary is crossed by simply repeatedly detecting its location and comparing a small number of the detected locations to the geofence boundaries. In some embodiments, the mobile device need not repeatedly attempt to estimate the vehicle's location, repeatedly determine its location relative to the vehicle's location, and/or repeatedly apply complex location-based rules.

Figure 1B:
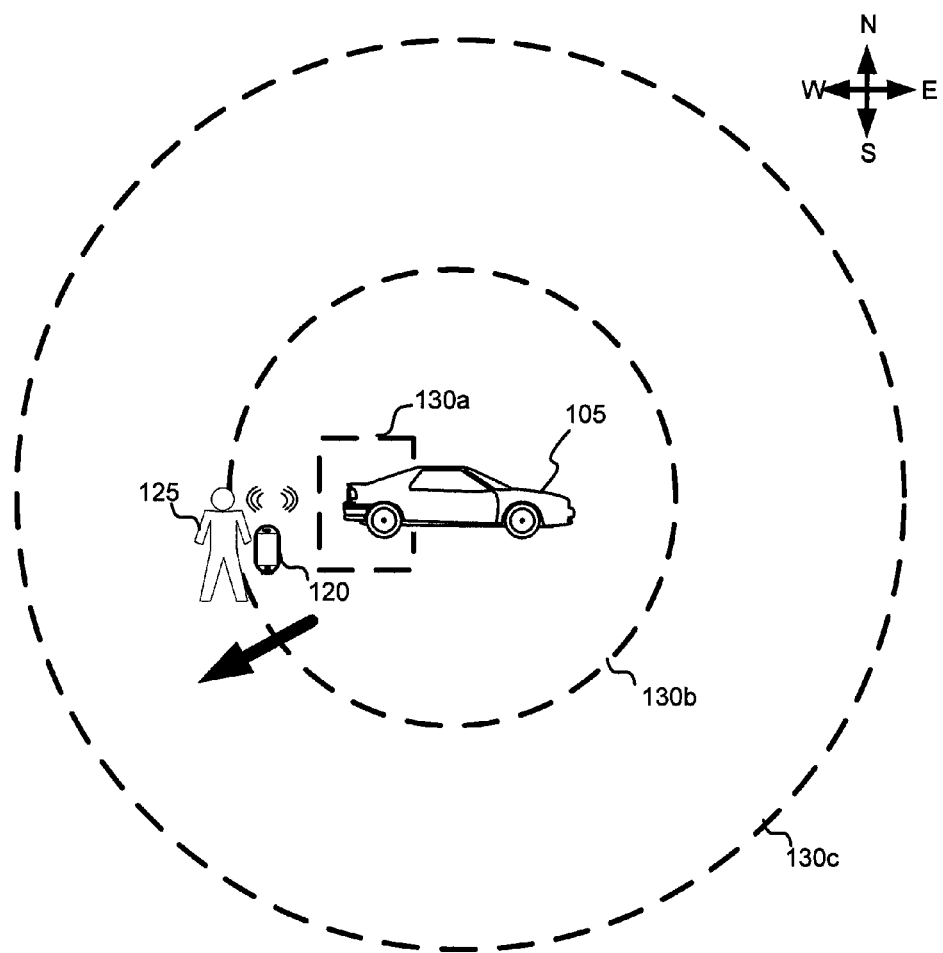
Figure 1C:
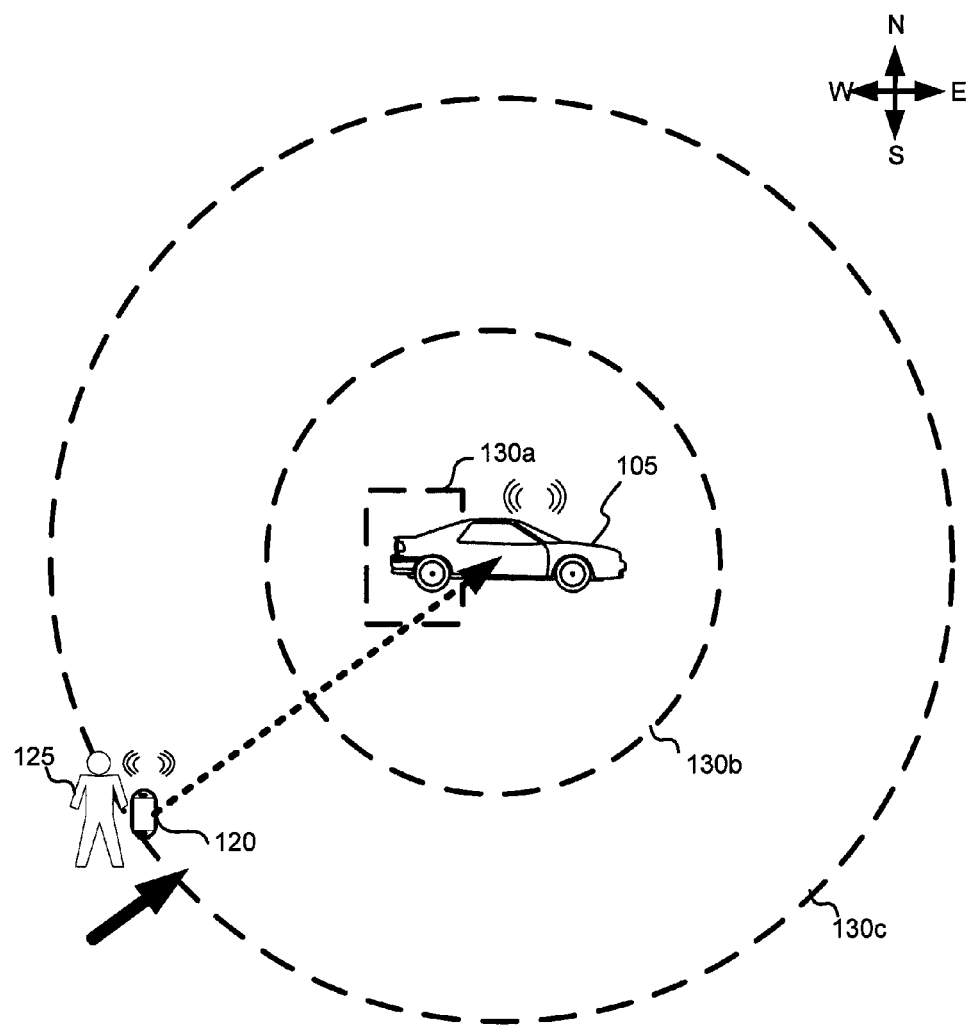

FIGS. 1A-1C illustrate an example of geofence operations. FIG. 1A shows a vehicle 105 that has been parked. Vehicle 105 can include, e.g., a commercial or non-commercial vehicle, such as a car, truck or sports utility vehicle. Vehicle 105 can include, e.g., a gasoline-powered vehicle, an electric vehicle, a solar-powered vehicle or a hybrid vehicle.

Vehicle 105 can include a variety of vehicle components 110, such as: wheels (e.g., four wheels or more wheels), doors (e.g., two or four doors), an engine, a transmission, a fuel cell, a battery, a motor, a hood, a trunk, a heating and/or cooling system (for heating or cooling a cabin of the vehicle), a defroster, seats (e.g., two, four, five, six or more seats), seat warmers (e.g., one for each seat), seat-position adjusters, windows, window controllers (e.g., to control whether a window is open or closed), door locks (e.g., one for each door), a vehicle security alarm, a windshield, windshield wipers, a music controlling unit (e.g., that allows selection of music and outputs audio signals) and/or a navigation unit (e.g., that allows inputs of commute destinations and outputs routes of travel). Controlling one or more components can result in control of a function of vehicle 105. For example, controlling a heating and/or cooling system can result in a function of heating or cooling a vehicle cabin.

As used herein, a vehicle component 110 can refer to a component that is integrated into vehicle 105 and/or coupled with a part of vehicle 105. For example, a vehicle component 110 can include an independent navigation unit that can be brought into vehicle 105, and coupled to vehicle 105 via a power-supply source (e.g., a cigarette lighter adapter). As another example, a vehicle component 110 can include an independent music controller positioned within vehicle 105 and coupled to a vehicle accessory (described in greater detail below).

Vehicle 105 can include a vehicle accessory 115 (e.g., a head unit). Vehicle accessory 115 can be fixedly integrated into vehicle 105 and may include, e.g., a head piece. Vehicle accessory 115 can be located within vehicle 105 and can be capable of communicating with one or more vehicle components and transmitting and receiving wireless communications. For example, vehicle accessory 115 can transmit and/or receive signals over a network, such as the Internet and/or via a Bluetooth LE or Bluetooth connection. Thus, in some instances, vehicle accessory 115 can communicate with mobile device 120 even if mobile device 120 is not within a short range or line of sight from vehicle accessory 115 (e.g., by using a cellular phone network). In some instances, vehicle accessory 115 is further configured to transmit and/or receive signals via a physical coupling. Vehicle accessory 115 can, e.g., communicate with one or more vehicle components 110 via a wired connection.

In some embodiments, vehicle accessory 115 can communicate (e.g., wirelessly communicate) with a mobile device 120. Mobile device 120 can include any device that a vehicle operator 125 or user is likely to carry on his/her person and that is capable of communicating with a vehicle accessory 115 as described herein. Mobile device 120 can include a mobile computing device with a wireless interface, such as a laptop computer, a tablet device, a key fob, a car key, an access card, a multi-function device, a mobile phone, a portable gaming device, a portable multimedia player, a portable music player, a personal digital assistant (PDA), a portable electronic or electro-mechanical device and/or the like. For example, a mobile device 120 can be an iPod®, iPhone®, or iPad® device available from Apple Inc. of Cupertino, Calif. Mobile device 120 can include a device that is frequently carried by a vehicle operator 125.

As shown in FIG. 1A, vehicle accessory 115 can transmit a first signal to mobile device 120. The first signal can be transmitted, e.g., upon detecting that the vehicle is parked, at fixed intervals, or upon detecting that mobile device 120 is at least a threshold distance away from a vehicle location. In the example of FIG. 1A, the first signal is transmitted shortly after it is detected that vehicle 105 is parked, such that the first signal is transmitted as operator 125 is walking away from vehicle 105.

The first signal can include, e.g., a vCard and/or any other information indicating a location of vehicle 105. It will be appreciated that disclosures herein that reference a vCard can be extended to other types of signals (e.g., that have a format the encapsulates location coordinates, a street address or other location identifiers). The location can include a current location of vehicle 105 (e.g., identified by a location detector) or a predicted future location of vehicle 105 (e.g., identified based on an operator-identified destination and/or analysis of motion of vehicle 105).

Upon receiving the first signal, mobile device 120 can identify one or more virtual geofence boundaries. For example, FIG. 1B illustrates an example in which three geofence boundaries 130a-130c are generated. FIG. 1B is generally a top-down view, with respect to locations of vehicle 105, mobile device 120, operator 125 and geofence boundaries 130a-130b. Notably, the illustrations of vehicle 105, mobile device 120 and operator 125 are not depicted in a top-down manner such that each can be easily identifiable.

As shown, a first geofence boundary 130a includes rectangular region surrounding a trunk of vehicle 105. A second geofence boundary 130b and a third geofence boundary 130b include circular regions centered on a vehicle location and defined by different radii. Geofence boundaries can include other shapes. Defined geofence boundaries can include, e.g., a list, table or an algorithmic function identifying geographical-coordinate boundaries. Geofence boundaries can include boundaries that are absolute or relative to a base location. For example, a geofence boundary can include a set or algorithm defining absolute geographic coordinates of a geofence boundary based on an absolute geographic coordinate of vehicle 105 (e.g., determined from the first signal) and coordinates of the geofence boundary relative to the vehicle location (e.g., a perimeter between coordinates (−1,−1), (−1,1), (1,1), and (1,−1) in some units relative to the vehicle location, or a radius of, e.g., 10 meters from the vehicle location.

One or more geofence boundaries 130 can be associated with a crossing direction and/or a crossing speed. For example, crossing geofence boundary 130b in a direction away from vehicle 105 (i.e., as shown in FIG. 1B) can be inconsequential. Meanwhile, crossing geofence boundary 130b in a direction towards vehicle 105 can initiate signal generation and/or transmission to vehicle 105. As another example, detecting from which direction (e.g., from which azimuth) an ingress is made can influence an effect of the geofence cross (e.g., to selectively unlock or open one door most likely to be approached first).

Mobile device 120 can repeatedly monitor its location (e.g., by analyzing received Global Positioning System (GPS) signals, cell-tower signals, or WiFi-access-point signals). Upon determining that mobile device is crossing a geofence (e.g., in an associated direction), mobile device 120 can generate and/or transmit a signal to vehicle accessory 115. In some instances, signals are transmitted differently depending on which geofence is crossed or on a device location. For example, mobile device 120 can transmit a Bluetooth signal to vehicle accessory 115 upon crossing geofence boundary 130a or geofence boundary 130b but can transmit a signal via a cellular network upon crossing geofence boundary 130c. Thus, a boundary of a geofence 130 could be very far from vehicle 105 (e.g., encompassing a whole city), such that crossing of the geofence would indicate that it is very unlikely that a user will be returning to vehicle 105 in the near future (e.g., making it advantageous for vehicle functions to enter a deep-sleep mode and/or exit a standby mode). Despite the far distance separating the vehicle 105 and the geofence 130, mobile device 120 can continue to communicate with vehicle accessory 115 using, e.g., a network such as a cellular phone network.

FIG. 1C illustrates an example in which it is determined that mobile device 120 crossed geofence boundary 130c in an inward direction. In this instance, a rule associated with geofence boundary 130c indicates that a signal is to be generated and transmitted upon detecting a crossing of geofence boundary 130c in an inward direction. The signal can identify one or more vehicle-function controls. For example, the signal can include instructions to power on a navigation device and identify directions to a default destination (e.g., "home") or a destination input by operator 125 into mobile device 120. Vehicle accessory 115 can receive the transmitted signal and communicate with a navigation-device vehicle component 110.

It will be further appreciated that configurations shown in FIGS. 1A-1C and/or described in associated disclosures are illustrative and that variations and modifications are possible. For example, a single geofence 130 can be generated as opposed to multiple geofences, and a signal transmitted from mobile device 120 need not include any explicit instructions for function control; the function control can instead be determined by vehicle accessory 115 based on the mere receipt of the signal. As another example, vehicle accessory 115 may communicate with a separate controller that sends control data to vehicle components 110.

In some instances, a geofence 130 is not associated with an absolute location. Rather, a geofence 130 can be defined based on one or more separation times. For example, a vehicle 105 could begin to warm up when a mobile device 120 is estimated to be five minutes away and approaching vehicle 105. The estimated time can be determined, e.g., based on a detected movement and location (e.g., instantaneous, time-averaged, or extrapolated movement and location) of mobile device 120.

In some instances, a geofence 130 includes a height or altitude dimension. For example, a vehicle 105 parked in a parking garage can send a signal identifying the vehicle's geographic coordinates and altitude to a mobile device 120.

The altitude can be estimated, e.g., based on a integration of vertical acceleration. A geofence 130 can be constructed with a height dimension, e.g., such that control of vehicle functions are not inappropriately triggered when a mobile device crosses a longitude and/or latitude boundary but while at a different level of the parking garage.

Geofences 130 can be adjusted based on newly received signals. For example, vehicle accessory 115 can send a new signal to mobile device 120 upon detecting that vehicle 105 has moved or has again entered into a parked state. The movement of vehicle 105 can be due, e.g., to another user having driven the car or towing of the vehicle. Thus, in some instances, mobile device 120 can be relatively far from vehicle 105 at a time the new signal is transmitted. The new signal can therefore be transmitted, e.g., over a network (e.g., as opposed to Bluetooth communications or wired communications). The new signal can identify a new location of vehicle 105 or a movement of vehicle 105 relative to a previously identified location of vehicle 105, and mobile device 120 can thereafter adjust boundaries of geofences 130 based on the new location.

Figure 2:
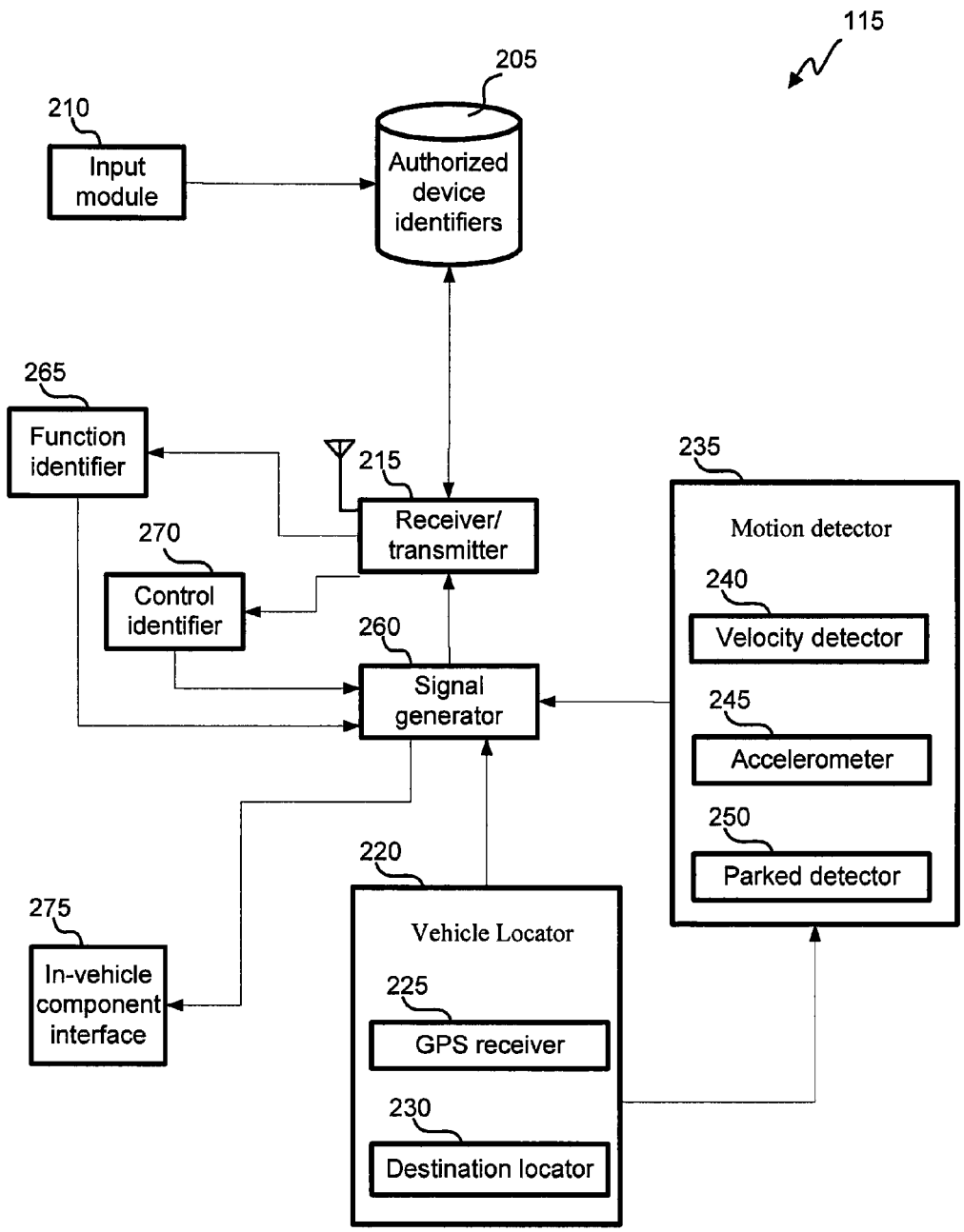
FIG. 2 illustrates an exemplary vehicle accessory that can communicate with a mobile device according to an embodiment of the present invention.

FIG. 2 is a block diagram showing an exemplary vehicle accessory. Vehicle accessory 115 can include a storage module, which can include one or more databases and stored data. For example, an authorized device identifier 205 can be stored. Authorized device identifiers 205 can identify properties (e.g., identifying properties) pertaining to one or more devices to which communications from vehicle accessory 115 are to be transmitted. Authorized device identifiers 205 can include an identification of one or more mobile devices 120 or components 110. Authorized device identifiers 205 can include, e.g., an IP address, a server name, an account name or address, a physical path, or a network path.

In some embodiments, one, some or all of authorized device identifiers 205 are received from a user via an input module 210. Input module 210 can be implemented as a touch screen (e.g., LCD based touch screen), a voice command system, a keyboard, a computer mouse, a trackball, a wireless remote, a button, and/or the like. Input module 210 can allow a user to provide inputs to establish authorized device identifiers 205 or to otherwise interact with vehicle accessory 115. In some embodiments, input module 210 comprises or is coupled to a display module (not shown). For example, vehicle accessory can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

In some embodiments, one, some or all authorized device identifiers 205 are received from a receiver/transmitter 215. Receiver/transmitter 215 can include a signal receiver, a signal transmitter, or a combination (e.g., a transceiver). Signals can be received, e.g., from a one or more mobile devices, one or more vehicle components 110, or other devices. Thus, for example, a mobile device 120 can transmit an initial signal, which is received by receiver/transmitter 215 of vehicle accessory 115. The initial signal can request that vehicle accessory 115 send one or more signals to mobile device 120, and can include a mobile-device identifier (e.g., an authorized device identifier 205). Thus, in various embodiments, a communication can be initialized between vehicle accessory 115 and a mobile device 120 either at vehicle accessory 115 (e.g., via input module 210) or at mobile device 120 (e.g., via receiver/transmitter 215).

Receiver/transmitter 215 can receive and/or transmit signals of one or more types. In some instances, receiver/transmitter 215 includes a multiple receivers and/or transmitters, each receiver and/or transmitter being configured to receive and/or transmit signals of different types with respect to other receivers and/or transmitters. For example, a first transceiver can be tuned to receive and transmit signals within first frequency bands and a second transceiver can be tuned to receive signals within second frequency bands. Examples of types of signals that can be received or transmitted include: wireless signals (e.g., RF signals), optical signals, or electrical signals. One or more receivers or transmitters can be tuned to receive or transmit signals at particular frequency bands.

Receiver/transmitter 215 can include suitable hardware for performing device discovery, connection establishment, and communication. Receiver/transmitter 215 can be configured to operate based, e.g., on Bluetooth LE and/or Bluetooth BR/EDR standards. Receiver/transmitter 215 can include hardware for performing wireless communications with wireless voice and/or data networks and can, e.g., include an RF transceiver (e.g., using mobile technology such as GSM or CDMA, advanced data network technology such as 3G, 4G or EDGE). Receiver/transmitter 215 can include any suitable combinations of hardware for performing WiFi (e.g., IEEE 802.11 family standards) based communications with other WiFi enabled devices.

Vehicle accessory 115 can include a vehicle locator 220 that estimates a past, current or future location of vehicle 105. In some instances, the estimated location of vehicle accessory 115 can serve as an estimated location of vehicle 105 (e.g., when vehicle accessory 115 is in or attached to vehicle 105). The estimated location can be based on an analysis of one or more signals. Analysis of the signals can allow for an estimation as to which external devices are relatively near vehicle accessory 115, which can allow for an estimation of a location of vehicle accessory 115. For example, the analysis can identify one or more (e.g., two, three, four or more) of GPS satellites, cell towers, WiFi access points or wireless servers (e.g., edge servers). Each external device can be associated with a known location, such that a location of vehicle 105 can be estimated, e.g., via a triangulation technique.

In some instances, signals analyzed by vehicle locator 220 are received by receiver/transmitter 215. In some instances, signals analyzed by vehicle locator 220 are received by one or more other components. For example, vehicle locator 220 can include or be coupled to a GPS receiver 225 that receives GPS signals identifying GPS satellites.

Vehicle locator 220 can estimate a location of vehicle 105, e.g., using a triangulation technique. Locations of GPS satellites, cell towers, WiFi access points, or servers can be determined, e.g., based on analyzing the signal (e.g., when the signal identifies a location), by consulting landmark-location storage data, by receiving (e.g., via receiver/transmitter 215) the locations, etc. In some instances, a location of vehicle 105 is determined by analyzing multiple signals received from a same type of external device (e.g., GPS satellites), and in some instances, a location of vehicle 105 is determined by analyzing multiple signals received from different types of external devices.

Vehicle locator 220 can include a destination locator 230. Destination locator can estimate a future location of vehicle 105. The future location can be estimated, e.g., by detecting a destination location entered by a user via input module 210 (e.g., to request directions to the destination location). The future location can also or alternatively be estimated, e.g., by analyzing motion patterns of the vehicle (e.g., extrapolating a future location based on locations associated with multiple time points).

In some instances, vehicle locator 220 estimates a vehicle location based on detected motion of vehicle 105. For example, vehicle locator 220 can integrate velocity or acceleration data (e.g., through repeated integrations) to determine a displacement from a previous location. The analyzed motion can be detected by a motion detector 235, described in further detail below.

In some embodiments, a location estimated by vehicle locator 220 includes an absolute and quantitative location, such as geographical coordinates and/or an altitude. In other embodiments, an estimated location can include a relative location (e.g., relative to a base point) and/or a qualitative location. The location can include a confidence interval or reliability metric. Vehicle locator 220 can further assign a time stamp to the estimated location. For example, it can assign a current time stamp to a an estimate of a current location of vehicle 105 or a specific future time stamp associated with prediction of a future location of vehicle 105. The time stamp can include an absolute time or relative time (e.g., relative to a time of a signal to be transmitted from vehicle accessory 115 to mobile device 120).

Vehicle accessory can include a motion detector 235 that estimates a past, current or future motion of vehicle 105. Motion detector can include a velocity detector 240 that estimates a past, current or future velocity of vehicle 105. In some instances, velocity detector 240 estimates a current velocity based on a plurality of estimated locations received from vehicle locator 220. For example, vehicle locator 220 can estimate multiple vehicle locations and can assign a time stamp to each estimate. Motion detector 235 can access the estimated location, and velocity detector 240 can analyze changes in vehicle locations relative to changes in the time stamps to estimate a current velocity.

Motion detector 235 can include an accelerometer 245 that detects an acceleration of vehicle 105 (e.g., by detecting an acceleration of vehicle accessory 115). In some instances, motion detector 235 estimates an acceleration of vehicle 105 by adjusting the acceleration detected by accelerometer 245 in view of a tilt of accelerometer 245, or by identifying a component of the detected acceleration.

Motion detector 235 can include a parked detector 250 that detects when vehicle 105 is parked and/or stationary. For example, parked detector 250 can receive signals from a transmission and/or brakes in vehicle 105 and determine that vehicle 105 is parked when the transmission is in park, a parking brake is engaged and/or an engine is not producing power. As another example, parked detector 250 can analyze current and/or time-lapsed location or motion variables to estimate whether vehicle 105 is parked. A parked state can be estimated upon determining that: vehicle 105 has remained in a same or highly similar location for a sustained period; vehicle 105 has been estimated to have substantially zero velocity for a sustained period; and/or vehicle 105 has been estimated to have substantially zero acceleration for a sustained period. The sustained period can be determined, e.g., by an input received by input module 210, a signal received by receiver/transmitter 215, application of a learning algorithm that empirically identifies appropriate thresholds, etc.

A signal generator 260 can receive outputs from vehicle location 220 and/or motion detector 235. One or more of the outputs can influence data within a signal generated by signal generator 260, and/or one or more of the outputs can influence when a signal is generated by signal generator 260. A generated signal can include data identifying a location of vehicle 105 estimated by vehicle locator 220. A generated signal can also include data identifying a motion of vehicle 105 estimated by motion detector 235. A generated signal can further include security codes, such as crypto key negotiation (e.g., secure pairing) that can be subsequently used to securely unlock various vehicle functions upon crossing of geofences).

In some instances, a signal is generated by signal generator 260 upon receiving output from motion detector 235 indicating that a particular type of motion has been detected (e.g., that parked detector 250 has detected that vehicle 105 is parked). Signal generation can be conditioned (alternatively or in addition) on other variables. For example, a signal can be generated upon receiving input from an engine indicating that vehicle 105 has been turned off. As another example, a signal can be generated upon receiving input from a user (via input module 210) or a signal from mobile device 120 (via receiver/transmitter 215) requesting generation and/or transmission of the signal. As yet another example, a signal can be generated at regular time points (e.g., transmission of the signals can be conditioned on specific events).

In some instances, the signal includes data indicating the vehicle location, e.g., in a vCard format. The signal can also include information pertaining to vehicle accessory 115 (e.g., a wireless-communication address, communication capabilities, etc.). Signal data can further identify a component or function of vehicle 105 and/or potential settings of the component or function.

The signal generated by signal generator 260 can be transmitted by receiver/transmitter 215. The generated signal can be transmitted, e.g., to a device identified by an authorized device identifier 205, such as a mobile device 120. Receiver/transmitter 215 can automatically transmit a signal upon receiving it from signal generator 260 or can, e.g., only transmit the signal upon determining that one or more criteria have been satisfied (e.g., estimating that the vehicle is parked). The generated signal can be transmitted wirelessly.

Receiver/transmitter 215 can receive one or more signals (e.g., from mobile device 120). In some instances, a received signal (e.g., a signal determined to be from mobile device 120) is routed to a function identifier 265 and a control identifier 270. Function identifier 265 can analyze the signal and determine a vehicle function and/or vehicle component that is to be controlled based on instructions in the signal. Control identifier 270 can analyze the signal and determine how the vehicle functions and/or vehicle components are to be controlled. In some instances, control identifier determines vehicle components that control a function identified by function identifier 265. In some instances, control identifier 270 analyzes a desired result or function output (e.g., "start car", "roll down windows", "lock car", etc.) and actions for one or more vehicle components to perform to achieve the desired result or function output.

Outputs from function identifier 265 and control identifier 270 can be transmitted to signal generator 260 or to another signal generator. A vehicle-control signal can be generated by signal generator 260 based on the outputs. The signal can be transmitted to vehicle components via an in-vehicle component interface 275. In-vehicle component interface 275 may include one or more properties as described herein with respect to receiver/transmitter 215. In some instances, in-vehicle component interface 275 includes a bus connecting the vehicle accessory to a vehicle-integrated component.

A particular vehicle accessory 215 can include one, some or all of the features shown in FIG. 2 and/or can include additional features not shown in FIG. 2. For example, in some instances, vehicle accessory 115 includes a vehicle-state identifier, and a signal generated by signal generator 260 and transmitted to mobile phone 120 can include vehicle-state information (e.g., car: on; defroster: off; or trunk: closed). As other examples, vehicle accessory 115 can include a clock, display module, power supply, motion detector, speaker, etc. In some instances, vehicle accessory 115 does not include, e.g., motion detector 235 and/or input module 210.

One or more components of vehicle accessory 115 (e.g., vehicle locator 220, motion detector 235, function identifier 265 or control identifier 270) can be implemented by one or more processors or one or more integrated circuits. One or more components of vehicle accessory 115 (e.g., vehicle locator 220, motion detector 235, function identifier 265 or control identifier 270) can correspond to implementation of one or more software programs. Software programs can be installed on vehicle accessory 115 by its manufacturer and/or installed by a user.

While vehicle accessory 115 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software A storage module (e.g., including authorized device identifiers 205) can be implemented, e.g., using disk, flash memory, random access memory (RAM), hybrid types of memory, optical disc drives or any other storage medium that can store program code and/or data. The storage module can further store software programs that define operations, e.g., of vehicle locator 220, motion detector 235, function identifier 265 or control identifier 270.

Figure 3:
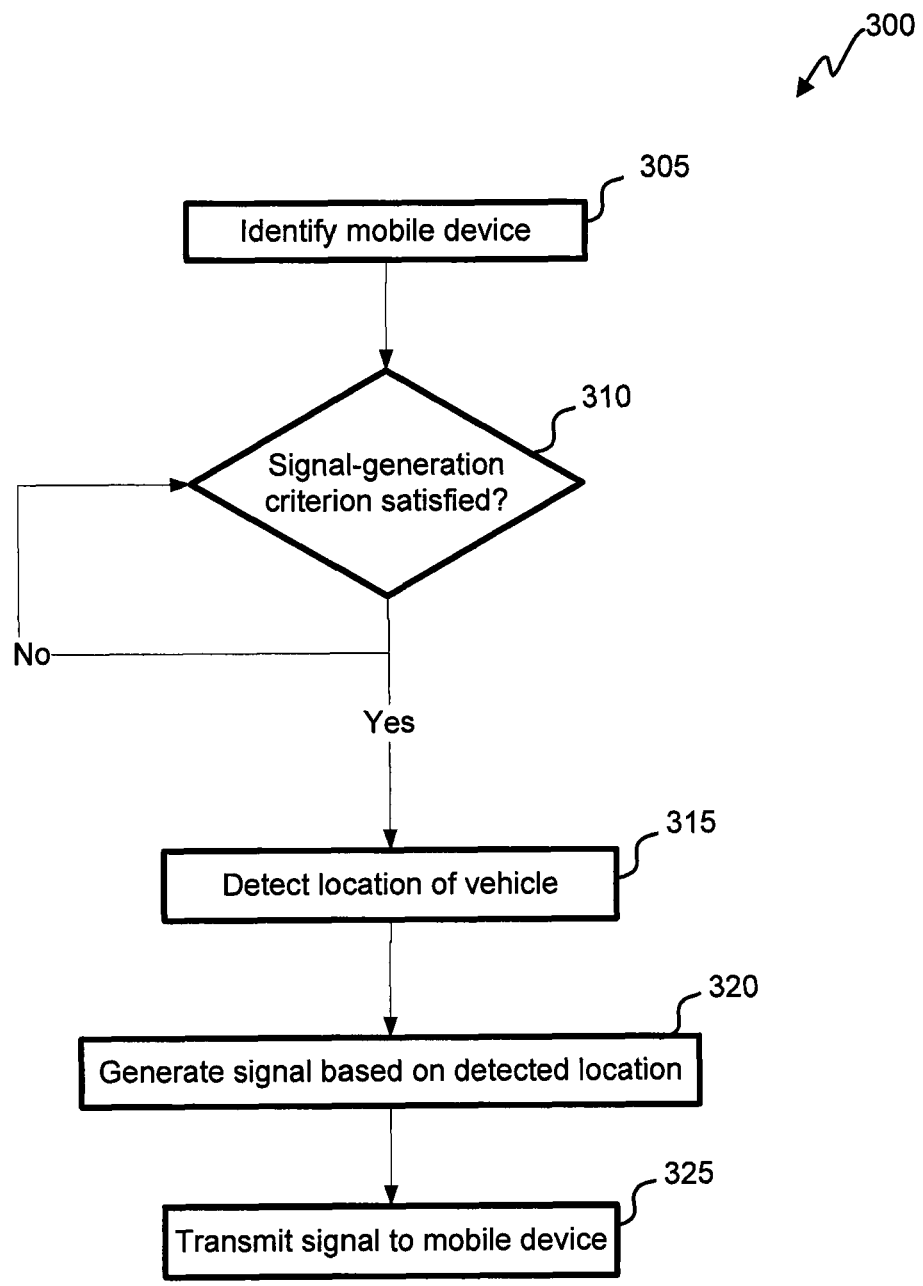
FIG. 3 is a flow diagram of a process for communicating data from a vehicle to a mobile device according to an embodiment of the present invention.

FIG. 3 is a flow diagram of a process 300 for communicating first data from a vehicle (e.g., via a vehicle accessory) to a mobile device. Process 300 can be performed by e.g., a vehicle accessory 115. Process 300 can be used, in certain embodiments, by vehicle accessory 115 to communicate with mobile device 120.

At block 305, a mobile device (e.g., mobile device 120) can be identified (e.g., such that vehicle accessory 115 has information as to where to send a communication). Identification of the mobile device can partly define a communication channel between vehicle accessory 115 and the mobile device (e.g., a specific mobile device). The mobile device can be identified based on one or more user inputs received, e.g., via input module 210 and/or based on one or more signals received by receiver/transmitter 215 from another device (e.g., mobile device 120). As another example, a mobile device can be identified by accessing a stored authorized device identifier 205. Authorized device identifier 205 can have been stored, e.g., subsequent to receiving user input identifying the mobile device or subsequent to receiving a signal from another device identifying the mobile device. In some instances, multiple mobile devices are identified. An identification of a mobile device can include, e.g., a name, a frequency band, or a virtual address associated with the mobile device. Thus, the mobile device can include any information usable to allow, e.g., vehicle accessory 215 to transmit a communication to the mobile device.

At block 310, it is determined whether a signal-generation criterion has been satisfied. For example, in some embodiments, a signal is to be generated upon determining that vehicle 105 is parked, only when vehicle 105 is parked, upon detecting a destination input (e.g., via an navigation unit), or at fixed intervals, upon receiving a request e.g., via input module 210 and/or via receiver/transmitter 215) for information.

If a signal-generation criterion is not satisfied, process 300 can repeats block 310 until it is determined that the signal-generation criterion is satisfied. If a signal-generation criterion is satisfied, process 300 continues to block 315, at which a location of vehicle 105 can be estimated. For example, a location of vehicle accessory 115 can be detected, and a location of vehicle 105 can be assumed to be the same as or related to the location of vehicle accessory 115. In some instances, positional properties of vehicle accessory 115 are identified (e.g., an orientation direction) and a location (e.g., geographic coordinates and an altitude) of vehicle accessory 115 are detected. If vehicle accessory 115 is reliably located in a constant location within vehicle 105, locations of specific vehicle components (e.g., a trunk, door, outer perimeter, etc.) can be further estimated.

At block 320, one or more signals are generated. The one or more signals can include data identifying the location detected at block 310. The signals can further include security information, such as a key that can be used to securely control or unlock vehicle functions. The signals can include, e.g., a vCard. At block 325, the one or more signals are transmitted to the mobile device that was identified at block 305. The signals can be, e.g., transmitted wirelessly via Bluetooth and/or WiFi technology and/or via a network (e.g., a cellular phone network).

Figure 4:
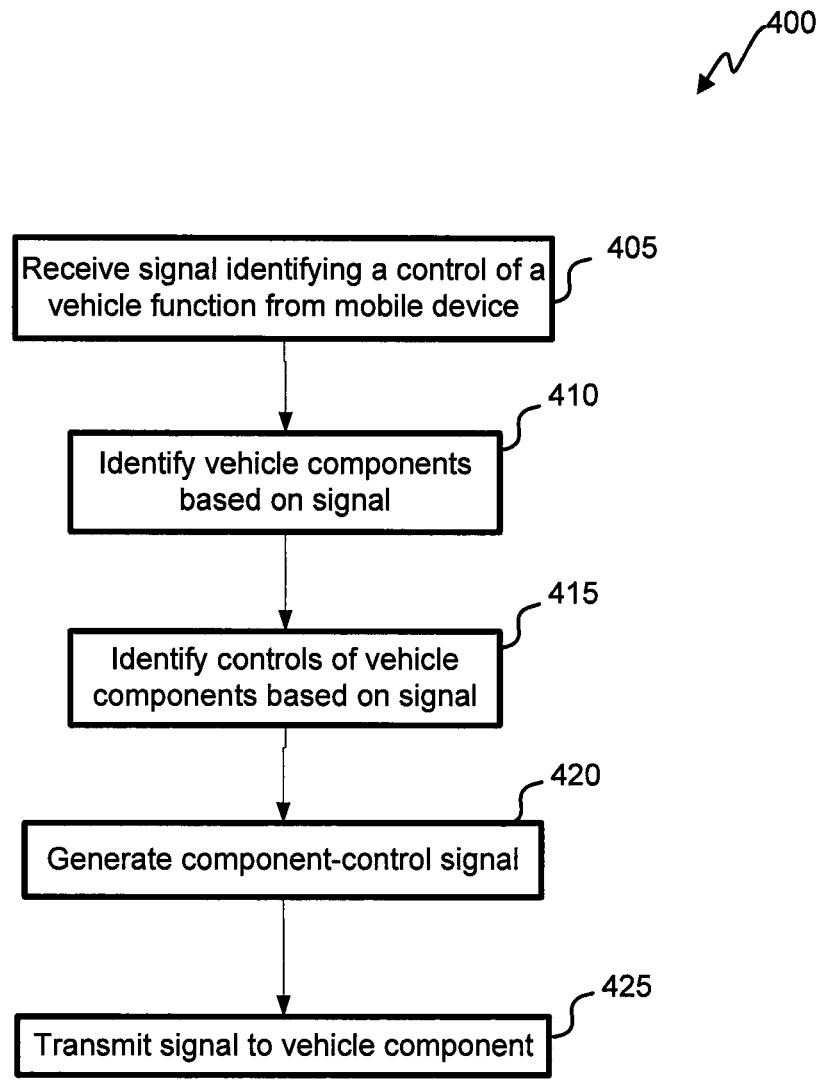
FIG. 4 is a flow diagram of a process for receiving data at a vehicle from a mobile device and controlling vehicle functions according to an embodiment of the present invention.

FIG. 4 is a flow diagram of a process 400 for controlling vehicle functions. Process 400 can be performed by e.g., a vehicle accessory 115. Process 400 can be used, in certain embodiments, by vehicle accessory 115 to receive communications from mobile device 120 and thereafter transmit communications that control vehicle functions.

At block 405, a signal is received from a mobile device (e.g., mobile device 120). In some instances, the mobile device previously received a signal (e.g., from vehicle accessory 115) identifying a location of the vehicle. The signal includes data that identifies a vehicle function and a control (e.g., setting) of the vehicle function (e.g., seat warming: on; or seat position: adjusted for Driver #1). The signal can include a wireless signal received by receiver/transmitter 215. The signal can include a radio-frequency and/or wireless signal and can have been transmitted via WiFi and/or Bluetooth technology or using a network.

At block 410, one or more vehicle components are identified (e.g., by function identifier 265) based at least in part on the received signal. For example, the received signal can indicate that the car cabin is to begin heating to 74 degrees, and one or more vehicle components associated with a car-heating function can be identified.

At block 415, controls of the one or more vehicle components are identified (e.g., by control identifier 270). The controls can indicate how each of the identified vehicle components are to be operated in order to achieve the vehicle-function control in the received signals. The controls can include, e.g., a power state (e.g., "on"; "off"; or "hibernate"), an activation state; a trigger of a mechanical operation (e.g., to pop a trunk or hood), a value along a continuum (e.g., a heating or cooling temperature) or a selection from a list (e.g., a selection of a song). For example, controls associated with a car-heating function can include: "On" and "72 degrees" or controls associated with a car defroster can include: "On" and "Medium high". Controls can include result-oriented features (such as those described above) or can include component-level actions to be performed (e.g., which circuits are to be connected, mechanical switches to be triggered, etc.).

At block 420, one or more signals are generated (e.g., by signal generator 260). The signals can include data identifying the controls. At block 425, the one or more signals are transmitted (e.g., by in-vehicle component interface 275) to the identified vehicle components.

One or more blocks of process 300 and/or process 400 can be repeated. In some instances, process 300 and/or process 400 can include one or more additional actions. For example, process 300 can include, prior to block 305, detecting a motion of vehicle 105, receiving input from a user (e.g., via input module 110) or receiving a request signal (e.g., via receiver/transmitter 115). The request signal or input can include data identifying the mobile device and/or can initiate the remainder of process 300. The signal-generation criterion at block 315 can then, e.g., relate to detecting a particular type of vehicle motion, receiving the input from the user, and/or receiving the request signal.

In some instances, process 300 and/or process 400 does not include one or more of the depicted blocks. For example, in some instances, the received signal can identify the vehicle components, and block 410 can be omitted.

It will be understood that variations of process 300 and/or process 400 are contemplated. For example, at block 410, in some instances, the one or more vehicle function are determined based on other data in the received signal. For example, the received signal can include a location of the mobile device or a distance between the mobile device and vehicle, and it can be determined which vehicle functions are to be controlled based on the location or distance. As another example, signals generated at block 320 can be indirectly transmitted to the vehicle component. For example, a signal can be transmitted from vehicle accessory to an independent controller, which can then transmit signals to one or more vehicle components to control their operation. As yet another example, block 315 can be performed prior to block 310 (e.g., if a vehicle location is analyzed to determine if the signal-generation criterion is satisfied).

Figure 5:
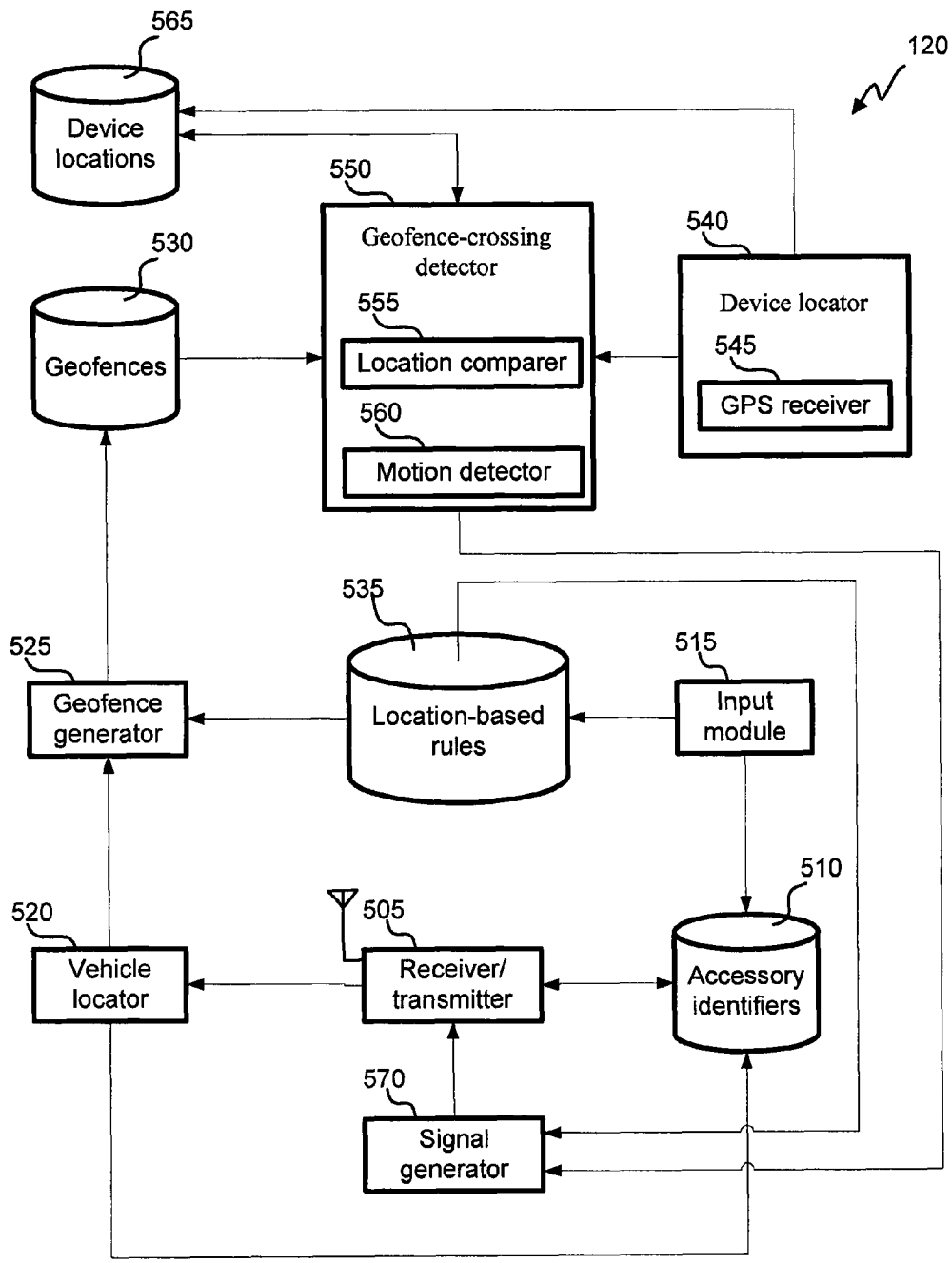
FIG. 5 illustrates a block diagram showing an exemplary mobile device according to an embodiment of the present invention.

FIG. 5 is a block diagram showing an exemplary mobile device 120. Mobile device 120 can include a receiver/transmitter 505 that can receive and/or transmit signals (e.g. from and/or to vehicle accessory 115). Receiver/transmitter 505 can include a signal receiver, a signal transmitter, or a combination (e.g., a transceiver). Receiver/transmitter 505 can receive and/or transmit signals of one or more types (e.g., Bluetooth signals, signals within various frequency bands, WiFi signals, etc). Receiver/transmitter 505 can include suitable hardware for performing device discovery, connection establishment, and communication. Receiver/transmitter 505 can be configured to receive signals over a network, such as a cellular phone network or Internet network (e.g., a wireless Internet network). Receiver/transmitter 505 can be configured to operated based, e.g., on Bluetooth LE and/or Bluetooth BR/EDR.

Mobile device 120 can include a storage module, which can include one or more databases and stored data. For example, one or more accessory identifiers 510 can be stored. Accessory identifiers 510 can identify properties pertaining to one or more devices (e.g., vehicle accessory 115) that previously have, can or are likely to send communications to mobile device 120. Accessory identifiers 510 can include, e.g., an IP address, a server name, an account name or address, a physical path, or a network path. Accessory identifiers 510 can include a location of a device (e.g., vehicle accessory 115), such as a default location, current location or last-known location.

Thus, in some embodiments, upon receipt of a signal from a vehicle accessory (e.g., via receiver/transmitter 505), mobile device 120 can identify the source of the signal by consulting the accessory identifiers 510 database. In some embodiments, upon receipt of a signal from a vehicle accessory (e.g., via receiver/transmitter 505), mobile device 120 can generate or update an accessory identifier 510.

Accessory identifiers 510 can further include data received from a user via an input module 515. Input module 515 can have some or all of the characteristics described above with respect to input module 210 of accessory 115. For example, input module 515 can include a touchscreen and can be coupled to a display module (not shown) of mobile device 120.

In some instances, a signal received by receiver/transmitter 505 is routed to a vehicle locator 520. Vehicle locator 520 can identify one or more estimated (e.g., past, current and/or future) locations and/or orientations of a vehicle and/or vehicle accessory. For example, a signal can include an estimated location and/or orientation of a vehicle accessory which can also serve as an estimated location and/or orientation of a vehicle. Vehicle locator 520 can identify the location and/or orientation by, e.g., detecting location and/or orientation data within signal data (e.g., GPS coordinates in a vCard). In some instances, a signal includes data with multiple locations and/or orientations, which can correspond to locations and/or orientations associated with different times (e.g., a current and future location) or different vehicle features (e.g., a front and back vehicle location). Vehicle locator 250 can select a location and/or orientation of interest or estimate another location and/or orientation based on the data-identified locations and/or orientations. Accessory identifiers 510 can be updated to include the identified location and/or orientation or the identified location and/or orientation can be, e.g., stored separately.

In some instances, vehicle locator 520 identifies estimated spatial properties of the vehicle. For example, vehicle locator 520 can estimate, e.g., a geometry of a vehicle, perimeter or a vehicle, or key points of a vehicle (such as a front-most point, back-most point, center point, trunk center, door points, etc.). Spatial properties can be estimated, e.g., by consulting stored data related to potential vehicle geometries, such as spatial data specific to a particular vehicle; spatial data general to multiple vehicles; data identifying relative positions between a vehicle-accessory location and other vehicle locations; etc.

Mobile device 120 can include a geofence generator 525 that generates one or more geofences 530 based at least in part on the vehicle location. Each generated geofence 530 can include a virtual (e.g., one-, two- or three-dimensional) boundary or perimeter defining an area, e.g., as shown in FIG. 1B. Generated geofences 530 can be stored, e.g., in a database. Generated geofences 530 can include, e.g., a list or algorithm defining absolute locations (e.g., geographical coordinates) of a perimeter of the geofences 530.

Geofence generator 525 can access one or more location-based rules 535. Location-based rules 535 can indicate under what circumstances and/or how one or more vehicle components and/or vehicle functions are to be controlled. For example, location-based rules 535 can indicate that the doors of a vehicle are to unlock upon detection that the mobile device is less than one foot from an exterior surface of a vehicle or less than fifteen feet from an approximated central vehicle point. Location-based rules 535 can be user defined, defined by a vehicle manufacturer, defined by a vehicle-accessory manufacturer, defined by a program being executed by mobile device 120 and/or vehicle accessory 115, etc. In some instances, location-based rules 535 are received from a user via input module 515. In some instances, location-based rules 535 are received via signals received by receiver/transmitter 505 (not shown). In some instances, location-based rules 535 are determined based on an analysis of data as to when and how a vehicle operator 125 empirically uses various vehicle functions.

Geofences 530 can further include a direction of crossing. The direction can include, e.g., crossing to an inside of a geofence or crossing to an outside of a geofence. Thus, the geofence can be directional in that crossing it in one direction is associated with a different consequence as compared to crossing it in another direction. In some instances, crossing a geofence at a particular point, along a particular direction and/or with a particular speed influences an effect of the vehicle crossing (e.g., which door is to be unlocked or open or how quickly a vehicle function is to ramp up operation).

Geofence generator 525 can generate the geofences 530 at least in part by accessing and applying location-based function controls 535 and the estimated vehicle location. Location-based function controls can identify spatial characteristics of geofences 530 and results to be effected upon crossing geofences 530. In some instances, the spatial characteristics of geofences 530 include characteristics relative to a general vehicle location (e.g., a vehicle is to be automatically started upon detecting that mobile device 120 is moving towards the vehicle and is less than 20 feet from the vehicle). Generated geofences 530 can apply the general rules to more specific vehicle locations, such that geofences' boundaries are more definitely defined and/or include absolute-location detail. For example, a general rule can indicate that a geofence includes a circular boundary with a 15-foot radius. Applying it to a vehicle location can identify an absolute location of the center (e.g., geographic coordinates) and can therefore also identify absolute locations associated with the circular perimeter.

Mobile device 120 can include a device locator 540 that estimates that estimates a location (e.g., a current location) of mobile device 120. The estimated location can be based on an analysis of one or more signals. Analysis of the signals can allow for an estimation as to which external devices are relatively near mobile device 120, which can allow for an estimation of a location of mobile device 120. For example, the analysis can identify one or more of GPS satellites, cell towers, WiFi access points or wireless servers (e.g., edge servers). Each external device can be associated with a known location, such that a location of mobile device 120 can be estimated, e.g., via a triangulation technique.

In some instances, signals analyzed by device locator 540 are received by receiver/transmitter 505. In some instances, signals analyzed by device locator 540 are received by one or more other components. For example, device locator 540 can include or be coupled to a GPS receiver 545 that receives GPS signals identifying GPS satellites.

Device locator 540 can estimate a location of vehicle 105, e.g., using a triangulation technique or by analyzing detected motion of vehicle 105 (e.g., and integrating time-lapsed motion to determine a displacement from a previous location). Locations of GPS satellites, cell towers, WiFi access points, or servers can be determined, e.g., based on analyzing the signal (e.g., when the signal identifies a location), by consulting landmark-location storage data, by receiving (e.g., via receiver/transmitter 505) the locations, etc. In some instances, a location of mobile device 120 is determined by analyzing multiple signals received from a same type of external device (e.g., GPS satellites), and in some instances, a location of mobile device 120 is determined by analyzing multiple signals received from different types of external devices.

The estimated location of mobile device 120 can be transmitted to geofence-crossing detector 550 which determines whether a geofence 530 has been crossed in an associated direction. Geofence-crossing detector 550 can include a location comparer 555 that can compare a location of mobile device 120 to a perimeter of a geofence 530. Location comparer 555 can be able to determine whether mobile device 120 is at, near, inside and/or outside of a geofence 130.

In some instances, geofence-crossing detector 550 includes a motion detector 560. Motion detector can include, e.g., an accelerometer. Based on the detected motion, geofence-crossing detector 550 can be able to determine whether mobile device 120 is moving towards an inside or outside of one or more geofences 530 and/or away from or towards a vehicle. Geofence-crossing detector 550 can then determine whether a geofence 530 has been crossed in particular direction. For example, the determination can be made when mobile device 120 is within a threshold distance from a geofence perimeter and moving in a geofence-associated direction.

In some instances, data is stored identifying absolute or relative device locations 565 associated with one or more time stamps. For example, at each time stamp of a plurality of time stamps, device locations 565 can indicate whether mobile device 120 is inside or outside each geofence 530. By comparing device locations 565 associated with multiple time points, geofence-crossing detector can determine whether a particular geofence was recently crossed and in which direction.

Upon a detection by geofence-crossing detector 550 that mobile device 120 has been crossed, a signal generator 570 can generate a signal. The signal can indicate that a geofence (generally) has been crossed, that a specific geofence has been crossed, a direction of geofence crossing, and/or vehicle components to be specifically controlled. The signal can additionally or alternatively identify one or more vehicle components and/or vehicle functions to be controlled and/or a manner in which they are to be controlled.

The signal can be transmitted by receiver/transmitter 505, e.g., to vehicle accessory 115. For example, the signal can be transmitted via WiFi technology or via a network (e.g., a cellular phone network) to vehicle accessory 115.

A mobile device 120 can include one, some or all of the features shown in FIG. 5 and/or can include additional features not shown in FIG. 5. For example, mobile device 120 can further include a display module, power supply, motion detector, speaker, vehicle-function analyzer that analyzes when and how a vehicle operator 125 uses vehicle functions, clock that identifies signal transmission or receipt times or location-estimation times, etc.

One or more components of mobile device 120 (e.g., receiver/transmitter 505, vehicle locator 520, geofence generator 525, device locator 540, geofence-crossing detector 550, or signal generator 570) can be implemented by one or more processors or one or more integrated circuits. One or more components of mobile device 120 (e.g., receiver/transmitter 505, vehicle locator 520, geofence generator 525, device locator 540, geofence-crossing detector 550, or signal generator 570) can correspond to implementation of one or more software programs, which can be, e.g., installed by a manufacturer of mobile device 120 and/or installed by a user.

While mobile device 120 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software A storage module (e.g., including accessory identifiers 510, geofences 530, location-based rules 535 or device locations 565) can be implemented, e.g., using disk, flash memory, RAM, hybrid types of memory, optical disc drives or any other storage medium that can store program code and/or data. The storage module can further store software programs that define operations, e.g., of receiver/transmitter 505, vehicle locator 520, geofence generator 525, device locator 540, geofence-crossing detector 550, or signal generator 570.

Figure 6:
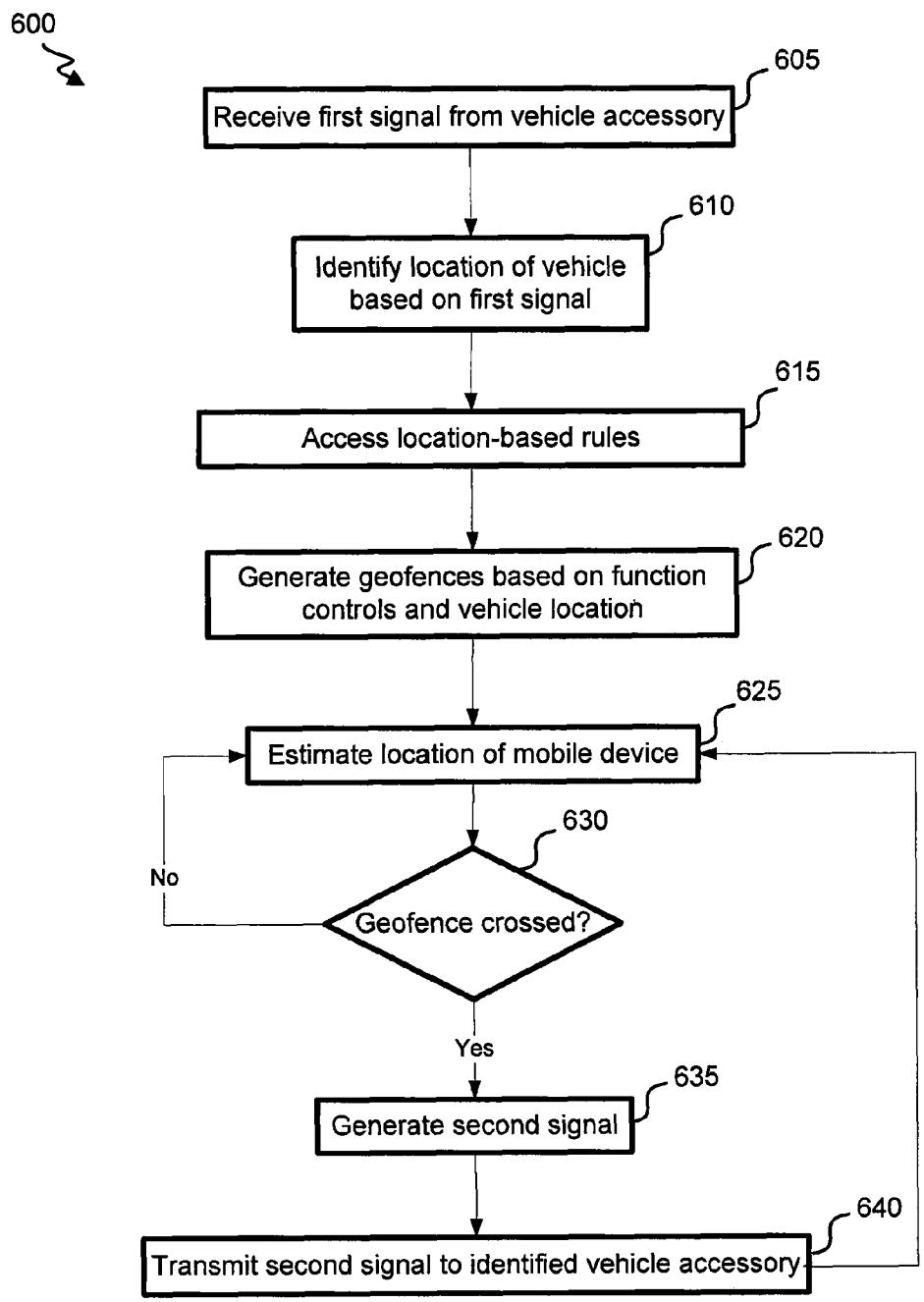
FIG. 6 is a flow diagram of a process for communicating between a mobile device and a vehicle according to an embodiment of the present invention.

FIG. 6 is a flow diagram of a process 600 for communicating with a vehicle accessory 115. Process 600 can be performed by e.g., a mobile device 120.

At block 605, a first signal can be received from a vehicle or vehicle accessory (e.g., vehicle accessory 115). The first signal can be received, e.g., by receiver/transmitter 505. The signal can include a vCard or any other data indicative of vehicle location.

At block 610, a location of a vehicle can be identified based on the first signal. For example, geographic coordinates can be extracted from the vCard included in the first signal. The location can include, e.g., a location of a vehicle accessory assumed to be within the vehicle. The location can include an absolute location, such as geographic coordinates.

At block 615, one or more location-based rules (e.g., location-based rules 535) can be accessed. For example, the location-based rules can be retrieved from storage, received via an input module from a user, received in the first signal or another received signal, etc.

At block 620, one or more geofences (e.g., geofences 530) can be generated based at least in part on the location-based rules and vehicle location. For example, the location-based rules accessed at block 615 can include one or more rules defining spatial properties and functional consequences associated with geofences, the spatial properties being relative to a general vehicle location. Based on the identified location of the vehicle at block 610, the geofence can be generated, e.g., to include an absolute-location boundary (e.g., geographic coordinates). Each generated geofence can be associated with a functional consequence and direction of crossing. For example, Geofence #1 can be associated with "turn on radio" when it is crossed in an interior-moving direction.

At block 625, a location of a mobile device can be estimated. The location can be estimated by, e.g., analyzing signals received from fixed-location external devices (e.g., GPS satellites, WiFi access points, cell towers, etc.). A triangulation technique can be applied to aggregate data from multiple signals and determine a more detailed location estimation. The estimated location can include, e.g., geographic coordinates.

At block 630, it can be determined whether a geofence has been crossed. The estimated location of mobile device 625 can be compared to a perimeter of a generated geofence. In some instances, multiple mobile-device locations are analyzed to determine whether mobile device recently crossed from outside the geofence to inside the geofence or the converse. In some instances, a location and motion of a mobile device is considered in determining whether the geofence was crossed. In some instances, other criterion are alternatively or additionally assessed. For example, it can be determined whether the geofence is crossed in a particular direction, or if an estimated time of arrival is less than a threshold, if a motion while crossing the geofence has a speed or velocity above or below a threshold.

If it is determined that no geofence has been crossed (and/or that other criteria is not satisfied), process 600 can return to block 625. If it is determined that a geofence has been crossed (and/or that other criteria is satisfied), process 600 continues at block 635. At block 635, a second signal is generated. The second signal can indicate that a geofence was crossed, that a specific geofence was crossed, a direction of crossing, a control of one or more vehicle functions and/or vehicle components to be effected, etc. The second signal can include a time stamp and/or an identifier of mobile device 120. The second signal can include a security feature or code, such as a key to unlock or control a vehicle function (e.g., a key identified in the first signal).

At block 640, the second signal can be transmitted to the vehicle accessory. Process 600 can then return to block 625. Thus, the location of mobile device 120 can be repeatedly monitored and it can be determined whether another geofence is subsequently crossed.

One or more blocks of process 600 can be repeated. FIG. 6 depicts an instance in which blocks 625-640 are repeated, e.g., to detect crossing of additional geofences. Other repetitions can also occur. For example, blocks 630-640 can be repeated (e.g., to ensure that only one geofence has been crossed).

In some instances, process 600 can include one or more additional actions, such as receiving user input defining the location-based rules, detecting a motion of the mobile device, accessing previous device locations, etc. In some instances, process 600 does not include one or more of the depicted blocks.

Figure 7:
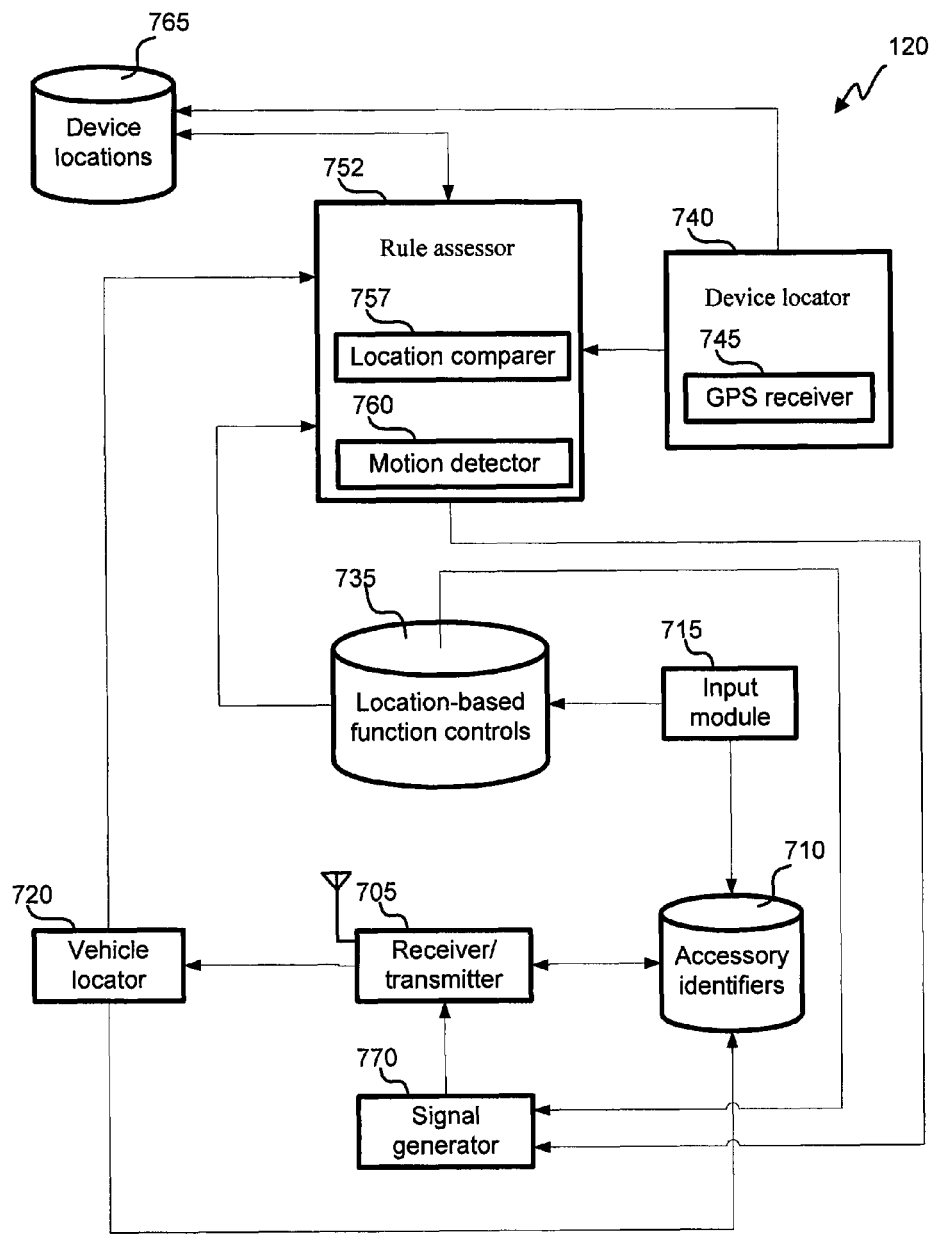
FIG. 7 illustrates a block diagram showing an exemplary mobile device according to an embodiment of the present invention.

FIG. 7 is a block diagram showing an exemplary mobile device 120. A number of the features of mobile device 120 shown in FIG. 7 are similar to similarly numbered features of mobile device 120 shown in FIG. 5. However, in the depicted embodiment, virtual geofences are not created. Rather, a rule assessor 752 receives a vehicle location identified by vehicle locator 720 and a location of mobile device 120 identified by device locator 740. Rule assessor 752 accesses one or more location-based rules 735 and determines whether the location of mobile device 120 relative to the location of the vehicle satisfies a rule criterion associated with a location-based rule 735.

Rule assessor 752 can include a location comparer 757 that can compare the vehicle location to the mobile-device location. In some instances, location identifies a one-dimensional or multi-dimensional distance separating the vehicle location and the mobile-device location. Upon determining that a rule criterion has been satisfied, a signal can be generated by signal generator 770.

Figure 8:
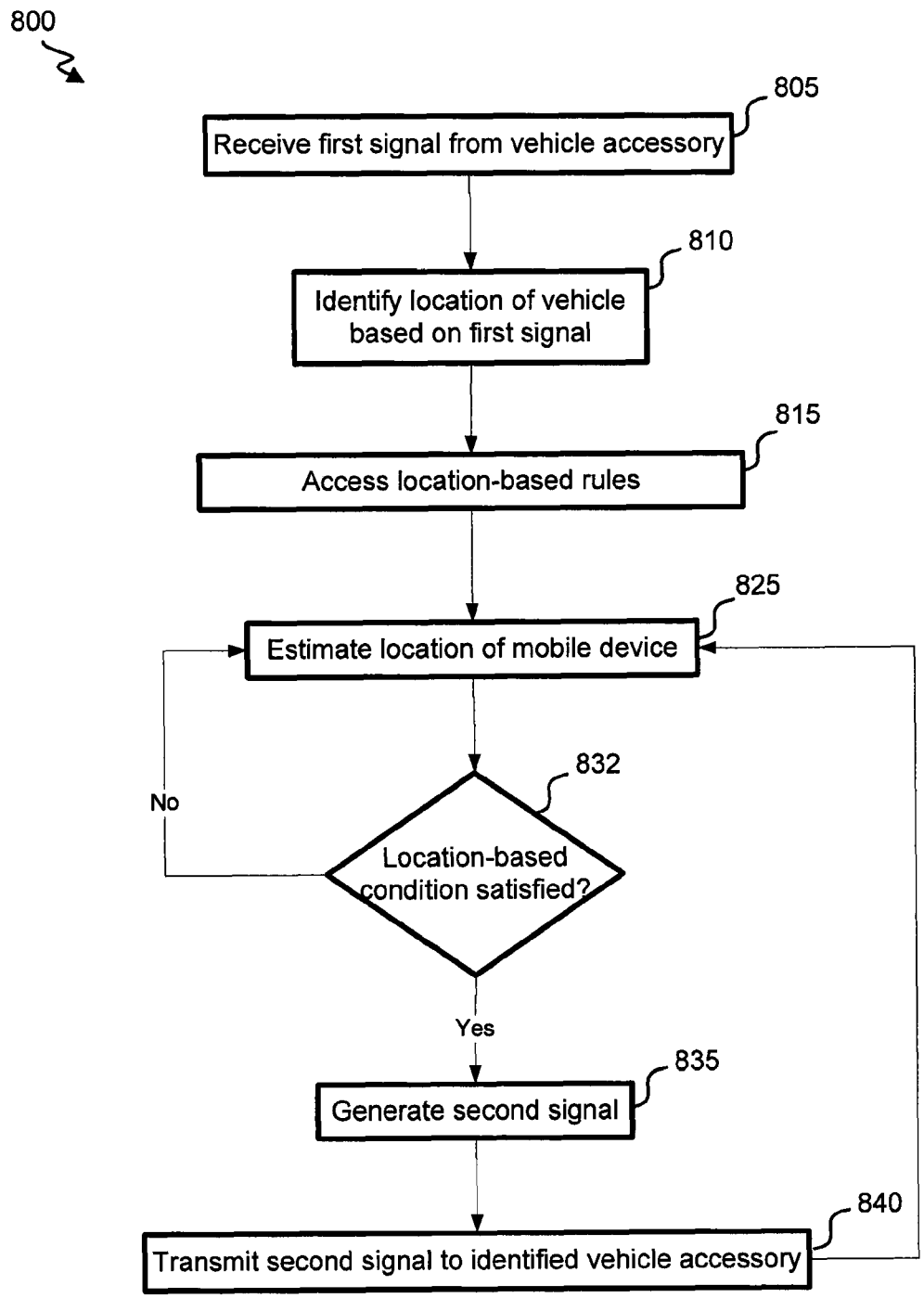
FIG. 8 is a flow diagram of a process for communicating between a mobile device and a vehicle according to an embodiment of the present invention.

FIG. 8 is a flow diagram of a process 800 for communicating with a vehicle accessory 115. Process 800 can be performed by e.g., a mobile device 120. A number of the features of process 800 shown in FIG. 8 are similar to similarly numbered features of process 600 shown in FIG. 6. However, in the embodiment of FIG. 8, virtual geofences are not generated.

At decision block 832, it is determined whether a location-based criterion is satisfied. The location-based criterion can be identified in a rule of a location-based function control accessed at block 815. For example, a music-selecting control can include and/or be associated with a rule with a location-based criterion (e.g., approaching car; within a distance of 15 feet). Determining whether the location-based criterion is satisfied can involve comparing a location of the vehicle to a location of the mobile device. In some instances, other criterion are alternatively or additionally assessed. For example, it can be determined whether the geofence is crossed in a particular direction, or if an estimated time of arrival is less than a threshold, if a motion while crossing the geofence has a speed or velocity above or below a threshold.

If no criterion is satisfied, process 800 returns to block 825. The location of the mobile device is then repeatedly monitored until it is determined that a location-based criterion is satisfied. If a criterion is satisfied, process 800 continues to block 835, at which a second signal is generated. Thus, FIGS. 7-8 illustrate that the concepts of generating a virtual geofence can, in some instances, be modified such that it is not necessary to identify an absolute-location geofence perimeter.

Figure 9:
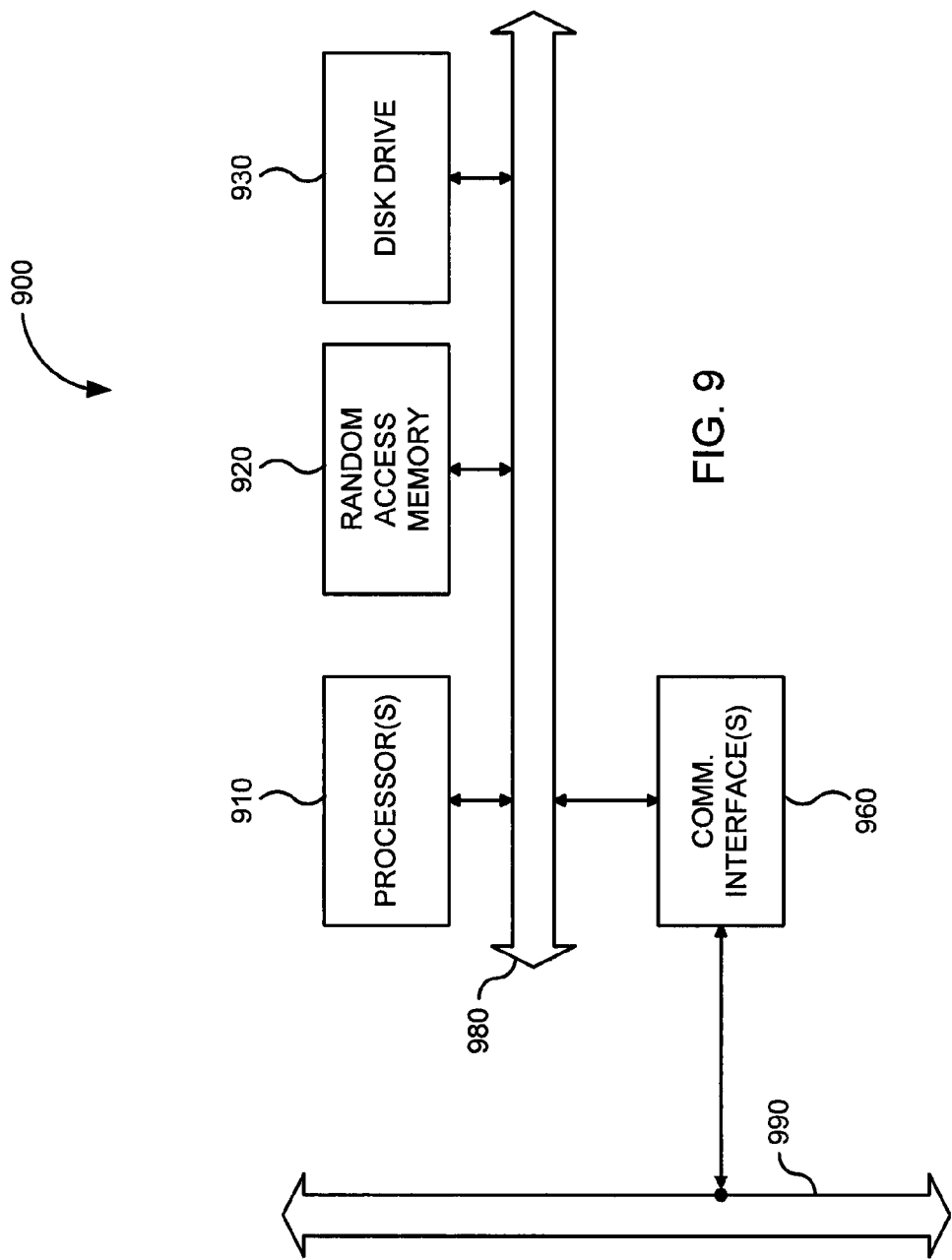
FIG. 9 illustrates an exemplary computer system that can be used according to an embodiment of the present invention.

FIG. 9 is a simplified block diagram of a computer system 900 that can be used in embodiments of the present invention. For example, vehicle accessory 115 and/or mobile device 120 can incorporate part or all of computer system 900. As another example, all or part of process 300, 400, 600 and/or 800 can be performed by part or all of computer system 900. FIG. 9 is merely illustrative of an embodiment incorporating the present invention and does not limit the scope of the invention as recited in the claims. One of ordinary skill in the art would recognize other variations, modifications, and alternatives.

In one embodiment, computer system 900 includes processor(s) 910, random access memory (RAM) 920, disk drive 930, communications interface(s) 960, and a system bus 980 interconnecting the above components. Other components can also be present.

RAM 920 and disk drive 930 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

Embodiments of communications interface 960 can include computer interfaces, such as an Ethernet card, wireless interface (e.g., Bluetooth, WiFi, etc.), a modem (telephone, satellite, cable, ISDN, (asynchronous) digital subscriber line (DSL) unit, FireWire interface, USB interface, and the like. For example, communications interface 960 can include interfaces to connect to a wireless network 990, and for transmitting and receiving data based over the network.

In various embodiments, computer system 900 can also include software that enables communications over a network such as the HTTP, TCP/IP, RTP/RTSP protocols, and the like. In alternative embodiments of the present invention, other communications software and transfer protocols can also be used, for example IPX, UDP or the like.

In various embodiments, computer system 900 can also include an operating system, such as OS X®, Microsoft Windows®, Linux®, real-time operating systems (RTOSs), embedded operating systems, open source operating systems, and proprietary operating systems, and the like. System 900 can also have other components e.g., user interface with keyboard, buttons, monitors, indicators, and the like.

It will be appreciated that though a singular vehicle accessory 115 and/or mobile device 120 can be referred to herein, in some embodiments, a plurality of vehicle accessories 115 and/or mobile devices 120 can be used instead.

It will further be appreciated that though figures and/or descriptions can refer to mobile device 120 including specific components or performing specific functions, in some embodiments, vehicle accessory 115 can additionally or alternatively include at least some of the components or perform at least some of the functions. For example, vehicle accessory 115 can include geofence generator 525 and can transmit a signal identifying the generated geofences. Similarly, though figures and/or descriptions can refer to vehicle accessory 115 including specific components or performing specific functions, in some embodiments, mobile device 120 can additionally or alternatively include at least some of the components or perform at least some of the functions. For example, mobile device 120 can include a motion detector 235 that detects motion based on multiple received vehicle locations.

Circuits, logic modules, processors, and/or other components can be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention can be encoded on various computer readable storage media; suitable media include magnetic disk or tape, optical storage media such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Embodiments described herein allow for mobile devices to intelligently communicate with and control vehicle features. Repeated generation of signals can exhaust batteries on mobile devices. In disclosed embodiments, a mobile device can selectively transmit signals based on a known location of a vehicle. When the device is, e.g., within or at least a specific distance from the vehicle, only then does it transmit a signal indicating that a vehicle function is to be controlled. Further, different vehicle functions can be controlled at independent times. For example, a vehicle begin heating the cabin prior to unlocking the doors. A vehicle operator can therefore passively and efficiently control feature operations of a vehicle.

Although the invention has been described with respect to specific embodiments, it will be appreciated that the invention is intended to cover all modifications and equivalents within the scope of the following claims.

What is claimed is:

1. A method for communicating between mobile devices and vehicles, the method comprising:
   receiving, at a mobile device, a first signal from a vehicle, the first signal identifying a location of the vehicle;
   subsequently determining, by the mobile device, a current location of the mobile device;

determining, by the mobile device, whether a location criterion is met, the determination being based on the current location of the mobile device and the location of the vehicle; and in the event that the location criterion is met, transmitting, by the mobile device, a second signal to the vehicle, wherein the second signal includes an instruction to control a function of the vehicle.

2. The method of claim 1 wherein determining whether the location criterion is met includes determining whether the mobile device has crossed a threshold, the threshold identifying a distance from the location of the vehicle.

3. The method of claim 2 wherein determining whether the location criterion is met further includes determining a direction of movement of the mobile device.

4. The method of claim 1 wherein the first signal comprises a vCard.

5. The method of claim 1 wherein the first signal identifies the location of the vehicle at a time that the first signal was sent from the vehicle.

6. The method of claim 1 wherein the vehicle comprises a vehicle accessory and the first signal is sent from the vehicle accessory.

7. A mobile device for communicating with a vehicle, the mobile device comprising:
   a vehicle locator configured to identify a location of the vehicle based at least in part on a signal received from the vehicle;
   a device locator configured to identify a location of the mobile device;
   a data store including one or more location-based rules, each location-based rule including a location-based criterion;
   a rule assessor configured to determine, for each rule of the one or more rules, whether the associated location-based criterion is satisfied, the determination being based at least in part on the location of the vehicle and the location of the mobile device;
   a signal generator configured to generate a signal to control a function of the vehicle; and
   a transmitter configured to transmit the generated signal,
   wherein the transmission of the signal is conditioned upon the determination, by the rule assessor, that the location-based criterion for at least one of the rules is satisfied, and
   wherein the function of the vehicle is associated with a rule for which the location-based has been satisfied.

8. The mobile device of claim 7 wherein the device comprises a Global Positioning System (GPS) receiver.

9. The mobile device of claim 7 wherein the rule assessor comprises a motion detector that detects a direction of movement of the mobile device.

10. The mobile device of claim 7 wherein at least one rule includes a criterion specifying a threshold distance from the vehicle.

11. The mobile device of claim 7 wherein the one or more rules comprise a plurality of rules, each rule being associated with a different location-based criterion.

12. The mobile device of claim 7 wherein the mobile device comprises a mobile phone.

13. A method for controlling vehicle functions, the method comprising:
   detecting, by a vehicle accessory, a location of a vehicle;
   generating, by the vehicle accessory, a first signal, the signal indicating the detected location;
   transmitting, by the vehicle accessory, the first signal to a mobile device;
   subsequently, by the vehicle accessory, receiving a second signal from the mobile device, wherein the second signal is indicative that a determination has been made, using the location of the vehicle and a location of the mobile device, that a location-based criterion has been satisfied;
   identifying, by the vehicle accessory a vehicle component based at least in part on the second signal;
   identifying, by the vehicle accessory, a control to be implemented by the vehicle component;
   generating, by the vehicle accessory, a third signal including an instruction that the vehicle component implement the control; and
   transmitting, by the vehicle accessory, the third signal.

14. The method of claim 13 further comprising inferring whether the vehicle is parked, wherein the first signal is transmitted in response to inferring the vehicle is parked.

15. The method of claim 13 further comprising:
   receiving, subsequent to the transmission of the first signal, a fourth signal from the mobile device;
   identifying a second vehicle component based at least in part on the fourth signal; and
   identifying a control to be implemented by the second vehicle component.

16. The method of claim 13 wherein the implementation of the control comprises unlocking one or more doors of the vehicle.

17. A device for controlling vehicle functions, the device comprising:
   a vehicle locator configured to identify a location of a vehicle;
   a signal generator configured to generate a first signal that includes the location of the vehicle;
   a transmitter configured to transmit the first signal to a mobile device;
   a receiver configured to receive a second signal from the mobile device, wherein the second signal is indicative that a determination has been made, using the location of the vehicle and a location of the mobile device, that a location-based criterion has been satisfied;
   a function identifier configured to identify a vehicle function to be controlled based on the second signal; and
   a control identifier configured to identify how the vehicle function is to be controlled based on the second signal.

18. The device of claim 17 wherein the device is located inside an exterior surface of the vehicle.

19. The method of claim 17 further comprising a motion detector that detects whether the vehicle is moving, wherein the first signal is transmitted subsequent to a detection that the vehicle is not moving.

20. The method of claim 17 wherein the vehicle locator comprises a GPS receiver to receive a signal from each of one or more GPS satellites, the location of the vehicle including a location estimate based on an analysis of the received signals.

21. A non-transitory computer-readable storage medium containing program instructions, which when executed by a processor of a mobile device cause the processor to execute a method of communicating location information, the method comprising:
   accessing stored data identifying a location of a vehicle;
   accessing data identifying a current location of a mobile device;
   determining a relative location of the mobile device, the relative location being relative to the location of the vehicle;
   accessing one or more location-based criteria;

determining whether each location-based criterion is satisfied based on the relative location of the mobile device; and upon determining that at least one location-based criterion is satisfied, initiating transmission of a signal to the vehicle, wherein the signal includes an instruction to control a function of the vehicle.

22. The computer-readable storage medium of claim 21 wherein the relative location of the mobile device comprises a distance between the mobile device and the vehicle.

23. The computer-readable storage medium of claim 21 wherein the signal identifies a function to be controlled at the vehicle.

24. The computer-readable storage medium of claim 21 further comprising generating one or more location-based criteria based on accessed user input.

* * * * *